US012809239B2

(12) United States Patent
Usukura

(10) Patent No.: US 12,809,239 B2
(45) Date of Patent: Nov. 24, 2026

(54) PROJECTOR

(71) Applicant: Sharp Display Technology Corporation, Kameyama City (JP)

(72) Inventor: Naru Usukura, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 299 days.

(21) Appl. No.: 18/404,936

(22) Filed: Jan. 5, 2024

(65) Prior Publication Data

US 2024/0272528 A1 Aug. 15, 2024

(30) Foreign Application Priority Data

Feb. 14, 2023 (JP) ................................ 2023-020772

(51) Int. Cl.
*G03B 21/00* (2006.01)
*G02F 1/1347* (2006.01)

(52) U.S. Cl.
CPC ....... *G03B 21/006* (2013.01); *G02F 1/13471* (2013.01)

(58) Field of Classification Search
CPC ...... G03B 21/00-64; H04N 9/31-3197; G02B 2027/0105-0198; G02B 27/00-648
See application file for complete search history.

(56) References Cited

U.S. PATENT DOCUMENTS

2005/0185139 A1* 8/2005 Yamanaka ........... G02B 27/283 348/E9.027
2021/0208389 A1* 7/2021 Lu ...................... G02B 27/0093
2023/0017524 A1* 1/2023 Peng .................. G02B 27/0075

FOREIGN PATENT DOCUMENTS

JP 05-119285 A 5/1993

* cited by examiner

*Primary Examiner* — Christopher A Lamb, II
(74) *Attorney, Agent, or Firm* — Keating & Bennett, LLP

(57) ABSTRACT

Provided is a projector that has a high light use efficiency and can switch irradiation regions. The projector includes: a light source; a polarization beam splitter configured to split light from the light source into P-polarized light and S-polarized light; a first reflective display configured to modulate the split P-polarized light; a second reflective display configured to modulate the split S-polarized light; a projector lens on which reflected lights from the reflective displays are incident; and a deflector disposed on or near a light-emitting side of the projector lens and configured to change a traveling direction of incident polarized light depending on the polarized light.

13 Claims, 15 Drawing Sheets

PROJECTOR

CROSS-REFERENCE TO RELATED APPLICATIONS

The present application claims priority under 35 U.S.C. § 119 to Japanese Patent Application No. 2023-020772 filed on Feb. 14, 2023, the contents of which are incorporated herein by reference in their entirety.

BACKGROUND OF THE INVENTION

Field of the Invention

The following disclosure relates to projectors.

Description of Related Art

A projector is an image display device that projects an image (or moving images) onto the target surface. A commonly known system of projectors employs as an image source a reflective display utilizing liquid crystals and uses a polarization beam splitter that splits incident light into P-polarized light and S-polarized light. While this system utilizing polarized light can create an image with little distortion, the system disadvantageously has a low light use efficiency.

To increase the light use efficiency, projectors have been suggested that use two reflective displays. For example, JP H05-119285 A discloses as a reflective liquid crystal display device a projection display device that uses two liquid crystal panel units, respectively processing S-polarized light and P-polarized light split by a polarization beam splitter, to superimpose the projection lights with each other on a screen to create an image.

BRIEF SUMMARY OF THE INVENTION

As described above, to increase the light use efficiency, projectors have been suggested that use two reflective displays as image sources. Although being expected to exhibit an increased light use efficiency, such projectors have room for improvement in that they require high costs and highly accurate positional alignment. For example, the projection display device disclosed in JP H05-119285 A requires high costs due to the use of two liquid crystal panel units, and is not expected to give cost-effective added values except for the increase in luminance.

Applications of projectors are expanding as they have recently been used not only for applying light to a fixed screen such as a rectangle screen to project images onto the screen, but also for projection mapping which projects images onto a three-dimensional object, e.g., an architectural structure, as a screen. In such projectors, a further increase in light use efficiency and expansion of applications can be expected if the irradiation region can be moved. However, conventional projectors are designed to irradiate only a certain area with light, and those that can switch irradiation regions have not yet been put into practical use. The projection display device described in JP H05-119285 A is also designed to irradiate a fixed irradiation region with light and cannot switch irradiation regions.

FIG. 15 is a view used to consider the light irradiation mechanism in a projector (projector of a comparative embodiment) having a configuration using a polarization beam splitter and two reflective displays. As shown in FIG. 15, a projector 1R of the comparative embodiment includes, in the light-emitting direction, a light source 10, a lens 20, a polarization beam splitter 30, two reflective displays 41 and 42, and a projector lens 50. Light from the light source 10 is made into substantially parallel rays through the lens 20 and the rays enter the polarization beam splitter 30, which transmits P-polarized light toward the reflective display 42 while reflecting S-polarized light toward the reflective display 41. The P-polarized light entering the reflective display 42 is converted to S-polarized light by the birefringence of the liquid crystal layer in the reflective display 42. The S-polarized light entering the reflective display 41 is converted to P-polarized light by the birefringence of the liquid crystal layer in the reflective display 41. These polarized lights are reflected by the corresponding reflective displays to reenter the polarization beam splitter 30. S-polarized light 12 from the reflective display 42 is reflected by the polarization beam spitter 30 to enter the projector lens 50. P-polarized light 11 from the reflective display 41 is transmitted through the polarization beam splitter 30 to enter the projector lens 50. These lights 11 and 12 traveling through the projector lens 50 reach a screen 70 with magnification (that is, these lights 11 and 12 traveling through the projector lens 50 are magnified and projected to a screen 70).

The projector 1R of the comparative embodiment cannot switch irradiation regions. On the screen 70, the irradiation region of the light 11 from the reflective display 41 is superimposed with the irradiation region of the light 12 from the reflective display 42, and thus the reflective display 41 and the reflective display 42 need to display the same image.

In response to the above issues, an object of the present invention is to provide a projector that has a high light use efficiency and can switch irradiation regions.

(1) One embodiment of the present invention is directed to a projector including: a light source; a polarization beam splitter configured to split light from the light source into P-polarized light and S-polarized light; a first reflective display configured to modulate the split P-polarized light; a second reflective display configured to modulate the split S-polarized light; a projector lens on which reflected lights from the reflective displays are incident; and a deflector disposed on or near a light-emitting side of the projector lens and configured to change a traveling direction of incident polarized light depending on polarization of the light.

(2) In an embodiment of the present invention, the projector includes the structure (1), and the deflector is an element using liquid crystals.

(3) In an embodiment of the present invention, the projector includes the structure (1) or (2), and the deflector includes a PB deflector.

(4) In an embodiment of the present invention, the projector includes the structure (3), and the deflector includes two or more PB deflectors.

(5) In an embodiment of the present invention, the projector includes the structure (3), and the deflector includes four or more PB deflectors.

(6) In an embodiment of the present invention, the projector includes the structure (1), (2), (3), (4), or (5), and the deflector includes a switchable half-wave plate (sHWP).

(7) In an embodiment of the present invention, the projector includes the structure (1), (2), (3), (4), (5), or (6), the deflector includes a liquid crystal diffractive element, and the liquid crystal diffractive element is configured to change a traveling direction of incident polarized light depending on polarization of the light by regulating an alignment of liquid crystal molecules through voltage application.

(8) In an embodiment of the present invention, the projector includes the structure (7), and the number of liquid crystal diffractive element is one or more.

The present invention can provide a projector that has a high light use efficiency and can switch irradiation regions.

BRIEF DESCRIPTION OF THE DRAWINGS

FIG. 8B is a graph conceptually showing preferred luminance values of lights in a configuration where the irradiation region of light from the first reflective display and the irradiation region of light from the second reflective display are accurately separated from each other with no gap in between.

DETAILED DESCRIPTION OF THE INVENTION

Definition of Terms

Figure 1:
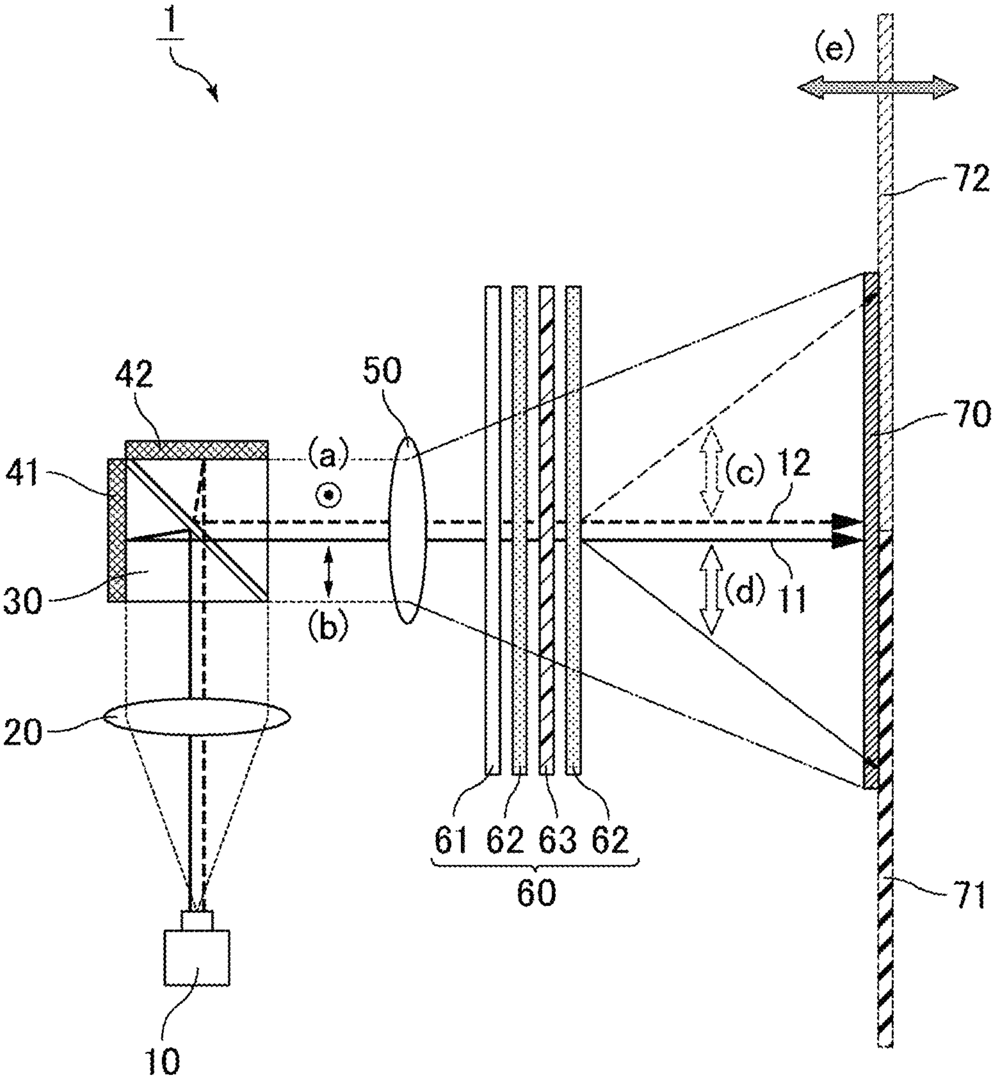
FIG. 1 is a schematic view used to consider the light irradiation mechanism in a projector of Embodiment 1.

Being "substantially parallel" means that an angle (absolute value) between objects in question falls within the range of 0°±10°. The angle preferably falls within the range of 0°±5°, more preferably within the range of 0°±3°, still more preferably within the range of 0°±1°, particularly preferably 0° (perfectly parallel).

Being "substantially perpendicular" or "substantially orthogonal" means that an angle (absolute value) formed between objects in question falls within the range of 90°±10°. The angle preferably falls within the range of 90°±5°, more preferably within the range of 90°±3°, still more preferably within the range of 90°±1°, particularly preferably 90° (perfectly perpendicular).

Visible light means light having a wavelength of 380 nm or longer and shorter than 800 nm.

A Pancharatnam-Berry deflector is also referred to as a PB deflector or a Pancharatnam-Berry phase deflector (PBD).

A λ/4 waveplate is also referred to as a quarter-wave plate (QWP).

A half-wave plate is also referred to as a λ/2 waveplate or an HWP. A switchable half-wave plate is also referred to as a switchable-HWP (sHWP).

Hereinbelow, projectors according to embodiments of the present invention are described. The present invention is not limited to the contents described in the following embodiments, and the design can be appropriately changed within the range satisfying the configuration of the present invention. In FIG. 1, FIG. 6 to FIG. 9, FIG. 10, and FIG. 12, for convenience, the deflection directions imposed by the deflector 60 are upward and downward, with the deflection direction of the light 11 from the first reflective display 41 being downward and the deflection direction of the light 12 from the second reflective display 42 being upward.

Embodiment 1

FIG. 1 is a schematic view used to consider the light irradiation mechanism in a projector of the present embodiment. As shown in FIG. 1, a projector 1 of the present embodiment at least includes, in the light-emitting direction, a light source 10, a polarization beam splitter 30, first and second reflective displays 41 and 42, a projector lens 50, and a deflector 60. The first reflective display 41 and the second reflective display 42 are collectively referred to as a reflective display 40.

The light source 10 emits light including visible light, and may be one that emits light consisting only of visible light or one that emits light including both visible light and ultraviolet light. A light source that emits white light is suitably used to allow the projector to perform color display. As for the type of the light source, suitably used is a halogen lamp, a light emitting diode (LED), or a laser light source, for example.

For more efficient use of light from the light source 10, the projector 1 preferably includes an optical element such as a lens in the path of light emitted from the light source 10. The projector 1 of the present embodiment includes a lens 20 between the light source 10 and the polarization beam splitter 30 (see FIG. 1). The lens 20 is preferably a collimator lens which causes light from the light source 10 to be substantially parallel rays. In the case of using an illumination LED as the light source 10, for example, the LED light can be incident on the reflective display 40 as substantially parallel rays after passing through the lens 20, so that the light use efficiency further increases.

The polarization beam splitter 30 splits light from the light source 10 into P-polarized light and S-polarized light. Specifically, the polarization beam splitter 30 transmits incident P-polarized light while reflecting incident S-polarized light which is polarized light orthogonal to P-polarized light. Although the present embodiment uses a polarization beam splitter 30 having a cubic shape (see FIG. 1), the polarization beam splitter 30 can also have a different shape (e.g., a plate shape).

The reflective display 40 is suitably one that uses liquid crystals. In this case, the birefringence of the liquid crystals can be used to convert P-polarized light incident on the reflective display 40 to S-polarized light and convert S-polarized light incident on the reflective display 40 to P-polarized light. Specific preferred examples of the reflective display 40 include reflective liquid crystal displays (LCDs). Suitable as the reflective LCDs are liquid crystal on silicon (LCOS: reflective liquid crystal panel using a silicon substrate). Yet, to facilitate cost reduction and size enlargement of a projection image, a reflective LCD using a glass substrate as its substrate may also be used. A reflective LCD has a structure including a liquid crystal layer between a pair of substrates and a reflective layer disposed on the back surface of the liquid crystal layer, and typically further includes various components such as electrodes, color filters, and polarizing plates.

The projector lens 50 is an element that magnifies incident light to apply the magnified light to the screens 70, 71, and 72, and may be any one usually used in the field of projectors. The number of the projector lenses 50 is not limited. The reference signs 70, 71, and 72 refer to the screens (i.e., the target surfaces on which an image is displayed), and also correspond to the irradiation regions of the projector 1. The reference sign 70 corresponds to the irradiation region of the light 11 from the first reflective display 41 and the light 12 from the second reflective display 42. The reference sign 71 corresponds to the irradiation region of the light 11. The reference sign 72 corresponds to the irradiation region of the light 12.

The deflector 60 changes the traveling direction of incident polarized light depending on polarization of the light. Specifically, the deflector 60 is an element capable of both changing the traveling direction of incident polarized light (i.e., deflecting the light) depending on polarization of the light and not changing the traveling direction of the incident polarized light (i.e., not deflecting the light).

The deflector 60 is preferably an element using liquid crystals. In particular, a deflector including a PB deflector (PBD) 62 is preferred. More preferred is a deflector including a λ/4 waveplate (QWP) 61 and a PBD 62 sequentially from the light incident side. Also, a deflector including a switchable half-wave plate (sHWP) 63 is suitable. Particularly preferred is a deflector at least including a QWP 61, a PBD 62, and a sHWP 63.

The QWP 61 is a waveplate that converts linearly polarized light to circularly polarized light. Linearly polarized light incident on the QWP 61 becomes circularly polarized light when emitted from the QWP 61.

The PBD 62 is an element that uses the periodic alignment of liquid crystal molecules to bend the traveling direction of incident polarized light depending on polarization of the light. In other words, the PBD 62 has a function of bending the traveling direction of light at a specific angle using diffraction generated due to the periodic alignment of liquid crystal molecules. The PBD 62 can bend the traveling direction of incident light upward, downward, leftward, rightward, or obliquely, for example.

Preferably, two or more PBDs 62 are included in the deflector 60. In other words, the deflector 60 suitably includes two or more PBDs 62. The number of the PBDs 62 may also be three or more. Yet, to apply light to the front of the projector lens 50, the number of the PBDs 62 is preferably an even number. For example, the deflector 60 also suitably includes four or more PBDs 62. In the present embodiment, a deflector 60 including two PBDs 62 is used as described below (see FIG. 1).

Figure 2A:
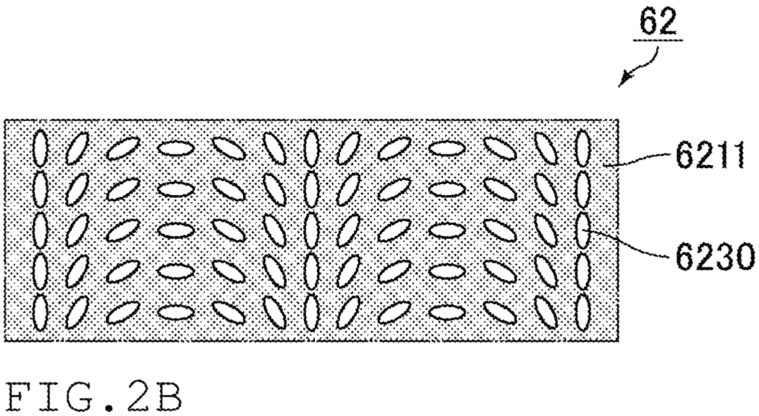
FIG. 2A is a view used to consider the alignment of liquid crystal molecules in a PB deflector in the projector of Embodiment 1 and is also a schematic plan view showing the alignment of liquid crystal molecules in a PB deflector as seen from the light incident side.
Figure 2B:
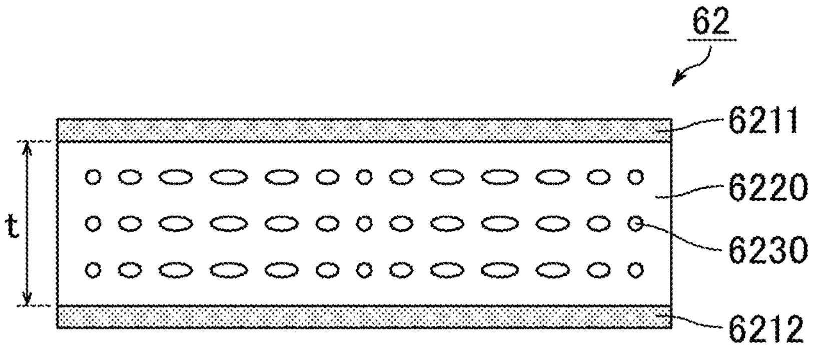
FIG. 2B is a schematic cross-sectional view of the PB deflector shown in FIG. 2A.
Figure 3A:
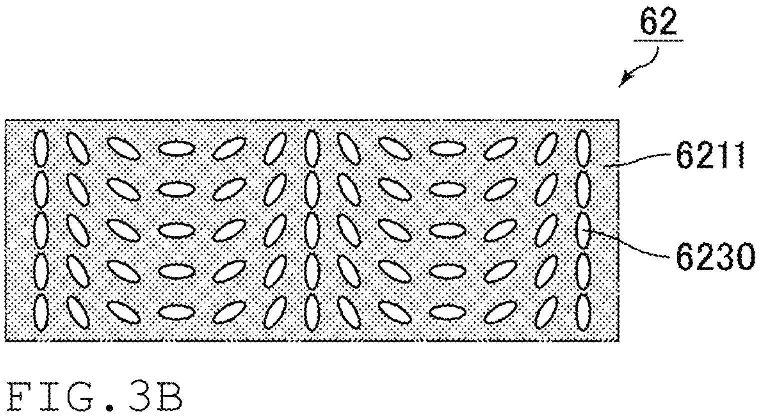
FIG. 3A is a view used to consider the alignment of liquid crystal molecules in a PB deflector in the projector of Embodiment 1 and is also a schematic plan view showing the alignment of liquid crystal molecules in a PB deflector as seen from the light incident side.
Figure 3B:
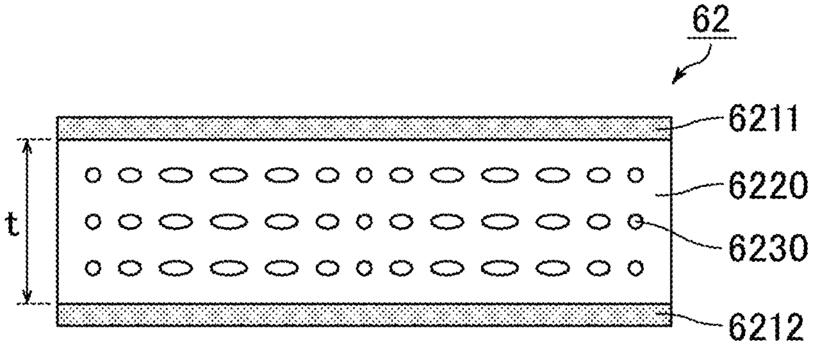
FIG. 3B is a schematic cross-sectional view of the PB deflector shown in FIG. 3A.

Each PBD 62 is suitably one having a structure in which a liquid crystal layer 6220 is sandwiched between a pair of substrates 6211 and 6212 (e.g., see FIG. 2B and FIG. 3B). When the thickness t of the liquid crystal layer 6220 in the PBD 62 is adjusted to a thickness with which a phase difference of λ/2 is introduced, circularly polarized light incident on the PBD 62 becomes opposite-handed circularly polarized light when emitted from the PBD 62.

For example, a case is described where the PBD 62 bends the traveling direction of incident light (e.g., circularly polarized light) leftward or rightward. The PBD 62 used is an element having a structure in which the liquid crystal layer 6220 is sandwiched between the pair of substrates 6211 and 6212, with the thickness t of the liquid crystal layer 6220 being a thickness with which a phase difference of λ/2 is introduced. When such a PBD 62 is viewed from above (i.e., viewed from the light incident side), the liquid crystal molecules 6230 can be aligned, for example, in any of the two patterns shown in FIG. 2A and FIG. 3A. FIG. 2A, FIG. 2B, FIG. 3A, and FIG. 3B are views used to consider the alignment of the liquid crystal molecules 6230 in the PBD 62. FIG. 2A and FIG. 3A are each a schematic plan view showing the alignment of liquid crystal molecules in the PBD 62 as seen from above the PBD 62 (i.e., seen from the light incident side). FIG. 2B is a schematic cross-sectional view of the PBD 62 shown in FIG. 2A. FIG. 3B is a schematic cross-sectional view of the PBD 62 shown in FIG. 3A.

Figure 2C:
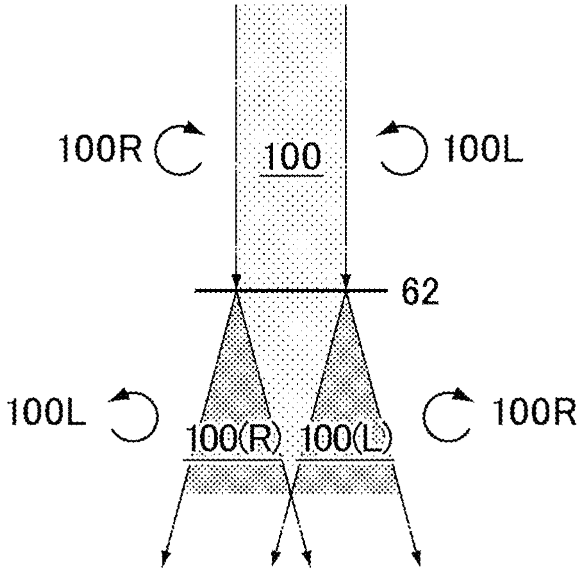
FIG. 2C is a view used to consider the deflection directions and the polarization states after circularly polarized lights have passed through a PB deflector having the alignment of liquid crystal molecules shown in FIG. 2A and FIG. 2B.

When circularly polarized light 100 incident on the PBD 62 having the alignment of liquid crystal molecules shown in FIG. 2A and FIG. 2B is right-handed circularly polarized light 100R, the traveling direction of the right-handed circularly polarized light 100R is bent rightward as it passes through the PBD 62 (see 100(R) in FIG. 2C). Here, the polarized light emitted therefrom is left-handed circularly polarized light 100L which is opposite to the incident light. When circularly polarized light 100 incident on the PBD 62 having the alignment of liquid crystal molecules shown in FIG. 2A and FIG. 2B is left-handed circularly polarized light 100L, the traveling direction of the left-handed circularly polarized light 100L is bent leftward as it passes through the PBD 62 (see 100(L) in FIG. 2C). Here, the polarized light emitted therefrom is right-handed circularly polarized light 100R which is opposite to the incident light. FIG. 2C is a view used to consider the deflection directions and the polarization states after circularly polarized lights have passed through the PBD 62 having the alignment of liquid crystal molecules shown in FIG. 2A and FIG. 2B.

Figure 3C:
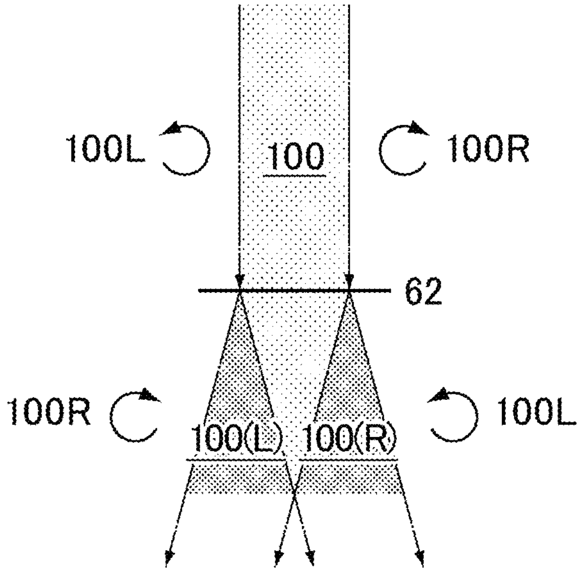
FIG. 3C is a view used to consider the deflection directions and the polarization states after circularly polarized lights have passed through a PB deflector having the alignment of liquid crystal molecules shown in FIG. 3A and FIG. 3B.

When the circularly polarized light 100 incident on the PBD 62 having the alignment of liquid crystal molecules shown in FIG. 3A and FIG. 3B is right-handed circularly polarized light 100R, the traveling direction of the right-handed circularly polarized light 100R is bent leftward as it passes through the PBD 62 (see 100(R) in FIG. 3C). Here, the polarized light emitted therefrom is left-handed circularly polarized light 100L which is opposite to the incident light. When the circularly polarized light 100 incident on the PBD 62 having the alignment of liquid crystal molecules shown in FIG. 3A and FIG. 3B is left-handed circularly polarized light 100L, the traveling direction of the left-handed circularly polarized light 100L is bent rightward as it passes through the PBD 62 (see 100(L) in FIG. 3C). Here, the polarized light emitted therefrom is right-handed circularly polarized light 100R which is opposite to the incident light. FIG. 3C is a view used to consider the deflection directions and the polarization states after circularly polarized lights have passed through the PBD 62 having the alignment of liquid crystal molecules shown in FIG. 3A and FIG. 3B.

The sHWP 63 is a waveplate that transmits circularly polarized light selectively as it is or by converting it to opposite-handed circularly polarized light. In other words, the sHWP 63 has a function of selectively switching between the mode (i) of converting incident circularly polarized light to opposite-handed circularly polarized light and emitting the light and the mode (ii) of emitting incident circularly polarized light as it is.

Figure 4:
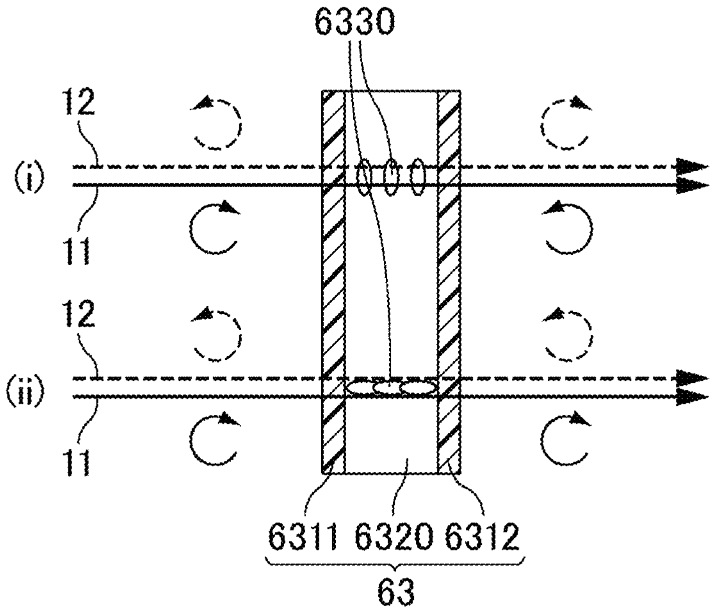
FIG. 4 is a view used to consider the polarization states after circularly polarized lights have passed through a switchable half-wave plate when the plate is set in the mode (i) of converting incident circularly polarized light into opposite-handed circularly polarized light and emitting the converted light and when the plate is set in the mode (ii) of emitting incident circularly polarized light as is.

The sHWP 63 is suitably one having a structure in which a liquid crystal layer 6320 is sandwiched between a pair of substrates 6311 and 6312 (e.g., see FIG. 4). The sHWP 63 usually further includes a pair of electrodes (not shown), for example. Including a liquid crystal layer, the SHWP 63 can use the characteristics of the liquid crystal molecules that the alignment of liquid crystal molecules changes in response to voltage application, thus achieving the above mode switching by turning on/off the voltage. FIG. 4 is a view used to consider the polarization states after circularly polarized lights have passed through the SHWP 63 when the sHWP 63 is set in the mode (i) and when the sHWP 63 is set in the mode (ii).

For example, when liquid crystal molecules 6330 are aligned substantially parallelly to the substrates 6311 and 6312, circularly polarized light having been incident on the sHWP 63 is converted to opposite-handed circularly polarized light when emitted from the sHWP 63 due to the phase difference introduced by the liquid crystal layer 6320 (see (i) in FIG. 4). In contrast, when the liquid crystal molecules 6330 are aligned substantially perpendicularly to the substrates 6311 and 6312, the liquid crystal layer 6320 introduces no phase difference, so that circularly polarized light having been incident on the sHWP 63 is emitted as the same-handed circularly polarized light (see (ii) in FIG. 4). In this manner, the sHWP 63 can switch between the mode (i) of converting incident circularly polarized light to opposite-handed circularly polarized light and emitting the light and the mode (ii) of emitting incident circularly polarized light as is by turning on/off the voltage.

The projector 1 may further include various components usually used in the field of projectors. Some components may be incorporated into another component.

Hereinbelow, the light irradiation mechanism and the image display mechanism, for example, of the projector 1 of the present embodiment are further described.

As shown in FIG. 1, light from the light source 10, preferably having passed through the lens 20, is split by the polarization beam splitter 30 into P-polarized light and S-polarized light. In other words, incident P-polarized light is transmitted through the polarization beam splitter 30 to enter the second reflective display 42, while incident S-polarized light is reflected by the polarization beam splitter 30 to enter the first reflective display 41. P-polarized light incident on the second reflective display 42 is converted to S-polarized light by the reflective display 42, reflected by the reflective display 42, incident on the polarization beam splitter 30 again, reflected by the polarization beam splitter 30, incident on the projector lens 50, and then incident on the deflector 60 (see the light 12 in FIG. 1). The (a) part in FIG. 1 indicates S-polarized light. Meanwhile, S-polarized light incident on the first reflective display 41 is converted to P-polarized light by the reflective display 41, reflected by the reflective display 41, incident on the polarization beam splitter 30 again, transmitted through the polarization beam splitter 30, incident on the projector lens 50, and then incident on the deflector 60 (see the light 11 in FIG. 1). The (b) part in FIG. 1 indicates P-polarized light. As described above, the light 11 from the first reflective display 41 and the light 12 from the second reflective display 42 undergo different polarizations, and the technical significance of the present invention lies in use of this difference in polarization.

In the present embodiment, the deflector 60 used is an element including the QWP 61, the PBD 62 (also referred to as the PBD 62(1)), the sHWP 63, and the PBD 62 (also referred to as the PBD 62(2)) sequentially from the light incident side (see FIG. 1). Polarized lights incident on the deflector 60 are converted to opposite-handed circularly polarized lights by the QWP 61. Thereafter, the polarized lights passing through the PBD 62(1) travel in directions different from each other. For example, in the case of the PBD 62 having a feature of bending the traveling direction of incident light leftward or rightward, the traveling direction of one of the light 11 and the light 12 is bent leftward and the other is bent rightward. In the case of the PBD 62 having a feature of bending the traveling direction of incident light upward or downward, the traveling direction of one of the light 11 and the light 12 is bent upward and the other is bent downward. Thus, the irradiation region of the light as a whole is widened as the light passes through the PBD 62. While the PBD 62 can bend the traveling direction of incident light as described above, the PBD 62 cannot work without bending the traveling direction (i.e., without affecting the light) due to its nature. Nevertheless, the deflector 60 of the present embodiment is enabled to cancel out the deflection provided by the PBD 62(1) by including the sHWP 63 disposed on the light-emitting side of the PBD 62(1) and switching the modes of the sHWP 63. The technical significance of the present invention also lies in this point that cancelling of the deflection is enabled.

Circularly polarized light and opposite-handed circularly polarized light emitted from the sHWP 63 act (behave) differently in the PBD 62(2) on which the lights are incident subsequently (see FIG. 2C and FIG. 3C). Use of this characteristic can further widen the irradiation region. As described above, the deflector 60 preferably includes the PBD 62 on the light-emitting side of the sHWP 63. For example, the PBD 62 may be disposed on the outermost emitting surface of the deflector 60.

The following describes the light deflection directions when the PBD 62(1) and the PBD 62(2) have a feature of bending the traveling direction of incident circularly polarized light upward or downward and the angle of the deflection provided by each PBD is 01 degrees.

The angle of deflection means an angle formed between the undeflected traveling direction of light and the deflected traveling direction of light. For example, the angle of deflection θ provided by the PBD 62 is in the relationship represented by the following equation (1):

$$\theta = A \sin(\lambda/p) \quad (1)$$

wherein λ represents the wavelength of light, and p represents the rotation period of the liquid crystal molecules in the liquid crystal layer 6220 in the PBD 62.

The light 11 and the light 12 incident on the deflector 60 are transmitted through the QWP 61 and then the PBD 62(1), so that the light 11 is deflected $\theta_1$ degrees downward and the light 12 is deflected $\theta_1$ degrees upward (see Table 1 and Table 2).

When the sHWP 63 disposed on the light-emitting side of the PBD 62(1) is set in the mode (i) of converting incident circularly polarized light to opposite-handed circularly polarized light and emitting the light, the light 11 deflected $\theta_1$ degrees downward by the PBD 62(1) is then deflected $\theta_1$ degrees upward by the PBD 62(2), while the light 12 deflected $\theta_1$ degrees upward by the PBD 62(1) is deflected $\theta_1$ degrees downward by the PBD 62(2) (see Table 1). As a result, the deflections provided to the light 11 and the light 12 are canceled out ($\theta_1-\theta_1=0$). On the screen, the centers of irradiation of both the light 11 and the light 12 are in front of the projector lens 50 (see Table 1). In other words, the irradiation region of the light 11 from the first reflective display 41 and the irradiation region of the light 12 from the second reflective display 42 are superimposed with each other (see the reference sign 70 in FIG. 5). The resulting irradiation region is referred to as the irradiation region (1).

Figure 5:
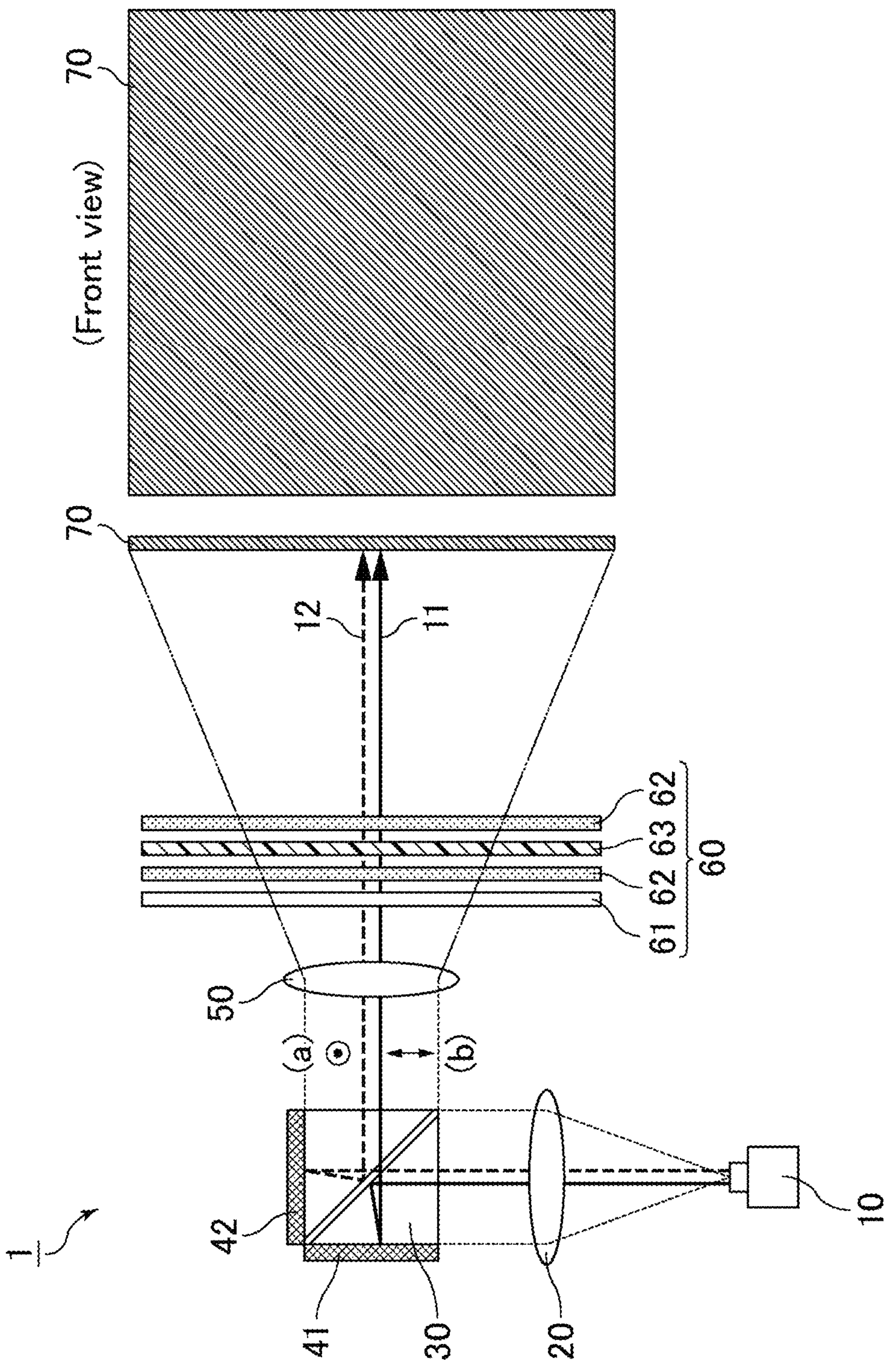
FIG. 5 is a schematic view showing the traveling directions of lights when the irradiation regions of the projector of Embodiment 1 form an irradiation region (1).

In this mode (i), the first reflective display 41 and the second reflective display 42 display the same image. The luminance of the irradiation region (1) is the sum of the luminance values of the individual lights. FIG. 5 is a schematic view showing the traveling directions of lights when the irradiation regions of the projector of the present embodiment form the irradiation region (1). FIG. 5 shows on the right side a view (front view) of the irradiation region (1) as seen from the projector lens 50 side.

When the sHWP 63 is set in the mode (ii) of emitting the incident circularly polarized light as is, the light 11 deflected $\theta_1$ degrees downward by the PBD 62(1) is further deflected $\theta_1$ degrees downward by the PBD 62(2), while the light 12 deflected $\theta_1$ degrees upward by the PBD 62(1) is further deflected $\theta_1$ degrees upward by the PBD 62(2) (see Table 2). As a result, the angles of deflection provided to the light 11 and the light 12 are each doubled ($2\times\theta_1$). This causes, on the screen, the center of irradiation of the light 11 to move ($2\times\theta_1$) degrees downward and the center of irradiation of the light 12 to move ($2\times\theta_1$) degrees upward (see Table 2). In other words, the irradiation region of the light as a whole is widened (see the reference signs 71 and 72 in FIG. 6). The whole irradiation region is referred to as the irradiation region (2).

Figure 6:
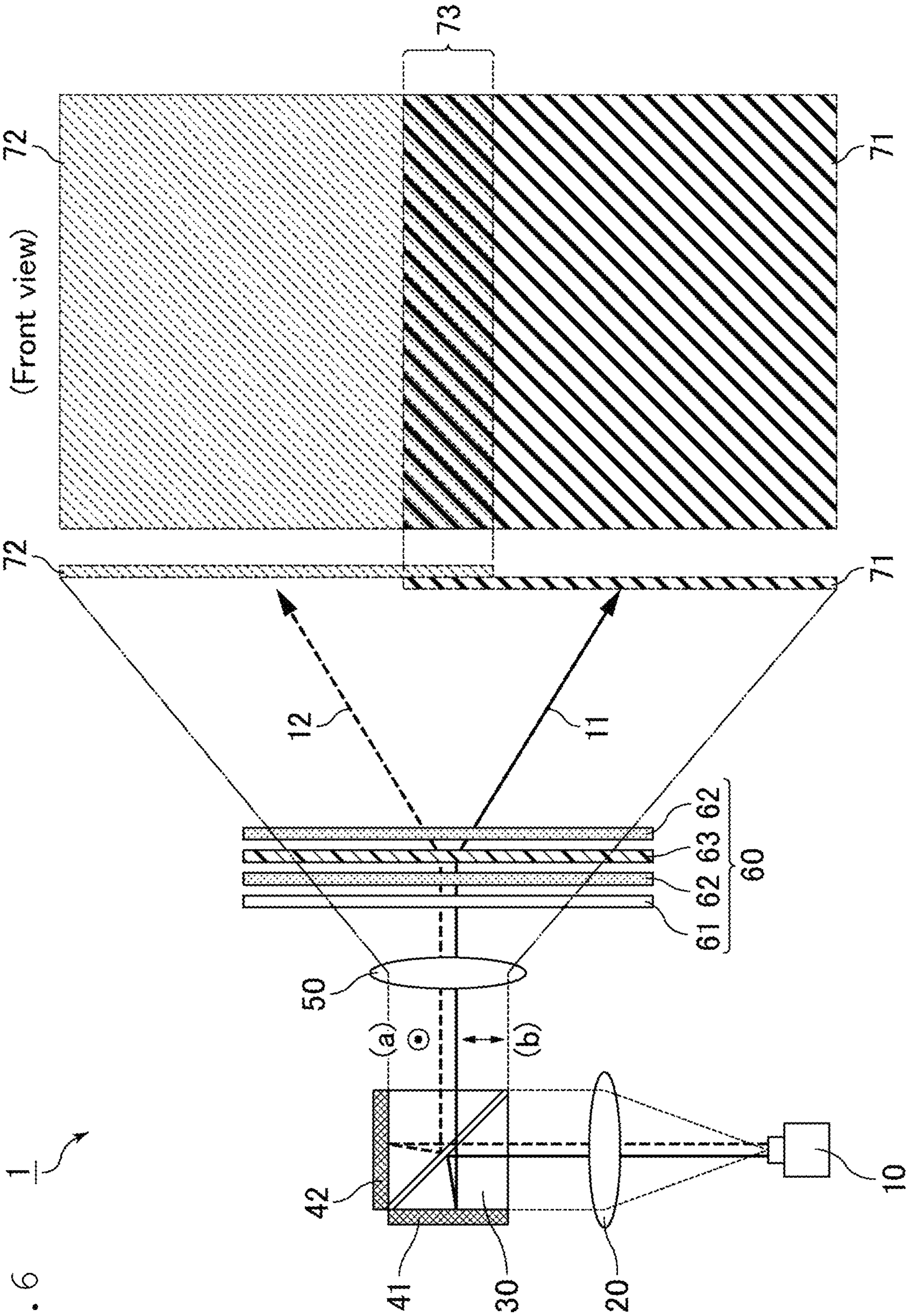
FIG. 6 is a schematic view showing the traveling directions of lights when the irradiation regions of the projector of Embodiment 1 form an irradiation region (2).

In the mode (ii), the first reflective display 41 and the second reflective display 42 display different images. The irradiation region (2) is wider in area than the irradiation region (1), but is about half the irradiation region (1) in basic luminance. FIG. 6 is a schematic view showing the traveling directions of lights when the irradiation regions of the projector of the present embodiment form the irradiation region (2). FIG. 6 shows on the right side a view (front view) of the irradiation region (2) as seen from the projector lens 50 side.

TABLE 1

| | PBD(1) | PBD(2) | Center of irradiation |
|---|---|---|---|
| Image light 11 from first reflective display | $\theta_1$ degrees downward | $\theta_1$ degrees upward | Front |
| Image light 12 from second reflective display | $\theta_1$ degrees upward | $\theta_1$ degrees downward | Front |

TABLE 2

| | PBD(1) | PBD(2) | Center of irradiation |
|---|---|---|---|
| Image light 11 from first reflective display | $\theta_1$ degrees downward | $\theta_1$ degrees downward | 2 × $\theta_1$ degrees downward |
| Image light 12 from second reflective display | $\theta_1$ degrees upward | $\theta_1$ degrees upward | 2 × $\theta_1$ degrees upward |

FIG. 1 shows both the case where the irradiation regions of the projector 1 form the irradiation region (1) (see FIG. 5) and the case where the irradiation regions form the irradiation region (2) (see FIG. 6). In FIG. 1, the arrow (c) indicates that switching between the mode (i) and the mode (ii) as above moves the center of irradiation of the light 12. The arrow (d) indicates that switching between the mode (i) and the mode (ii) as above moves the center of irradiation of the light 11. The arrow (e) indicates that switching between the mode (i) and the mode (ii) as above switches the irradiation regions.

In either the case where the irradiation regions of the projector 1 form the irradiation region (1) or the case they form the irradiation region (2), the projector 1 of the present embodiment efficiently irradiates the screen with light from the light source 10, thus enabling use of projector images with high light use efficiencies by switching the irradiation regions according to the usage scenarios.

The irradiation region (2) is further described.

Figure 7:
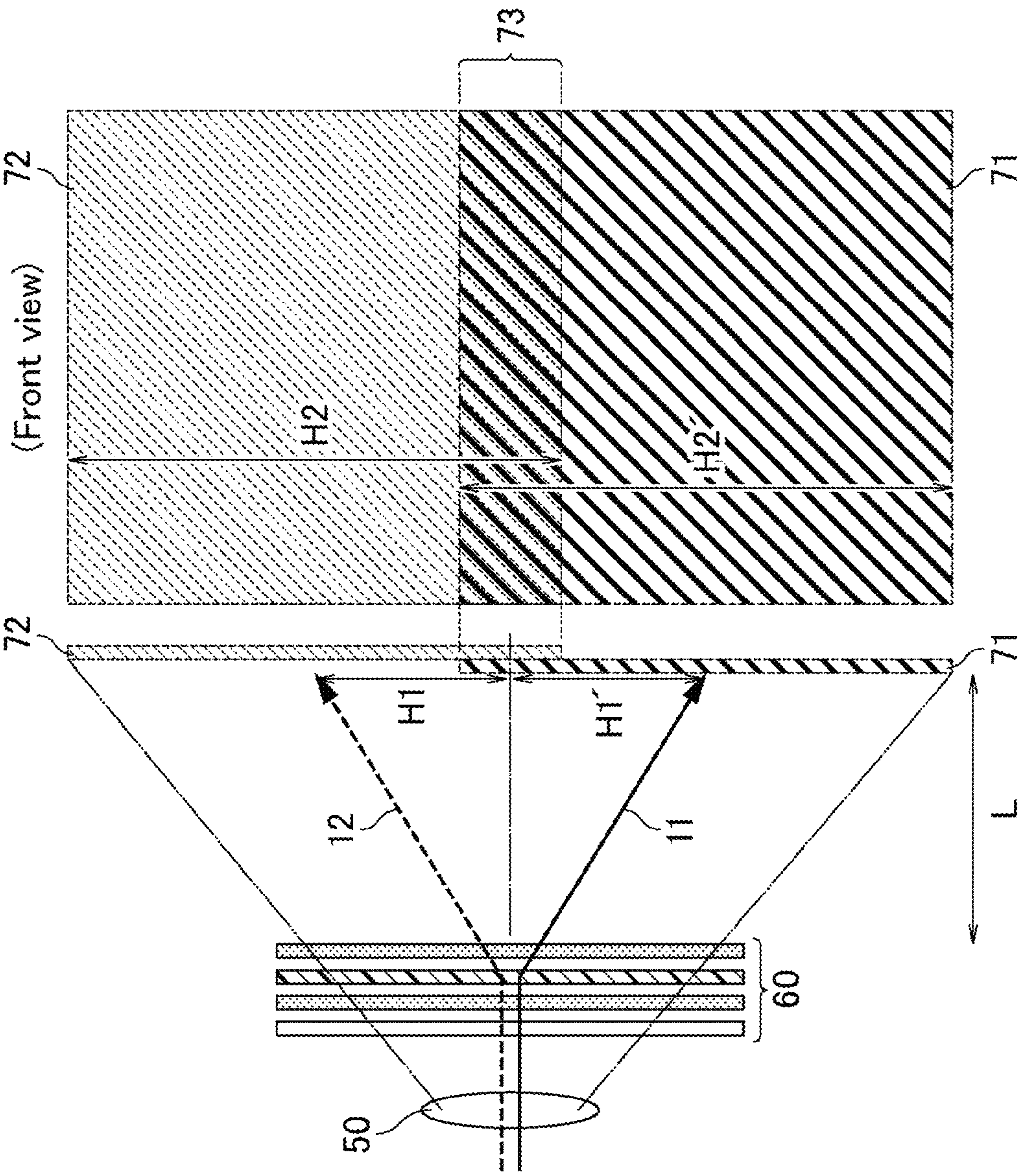
FIG. 7 is a schematic view showing a configuration of the irradiation region (2).
Figure 9:
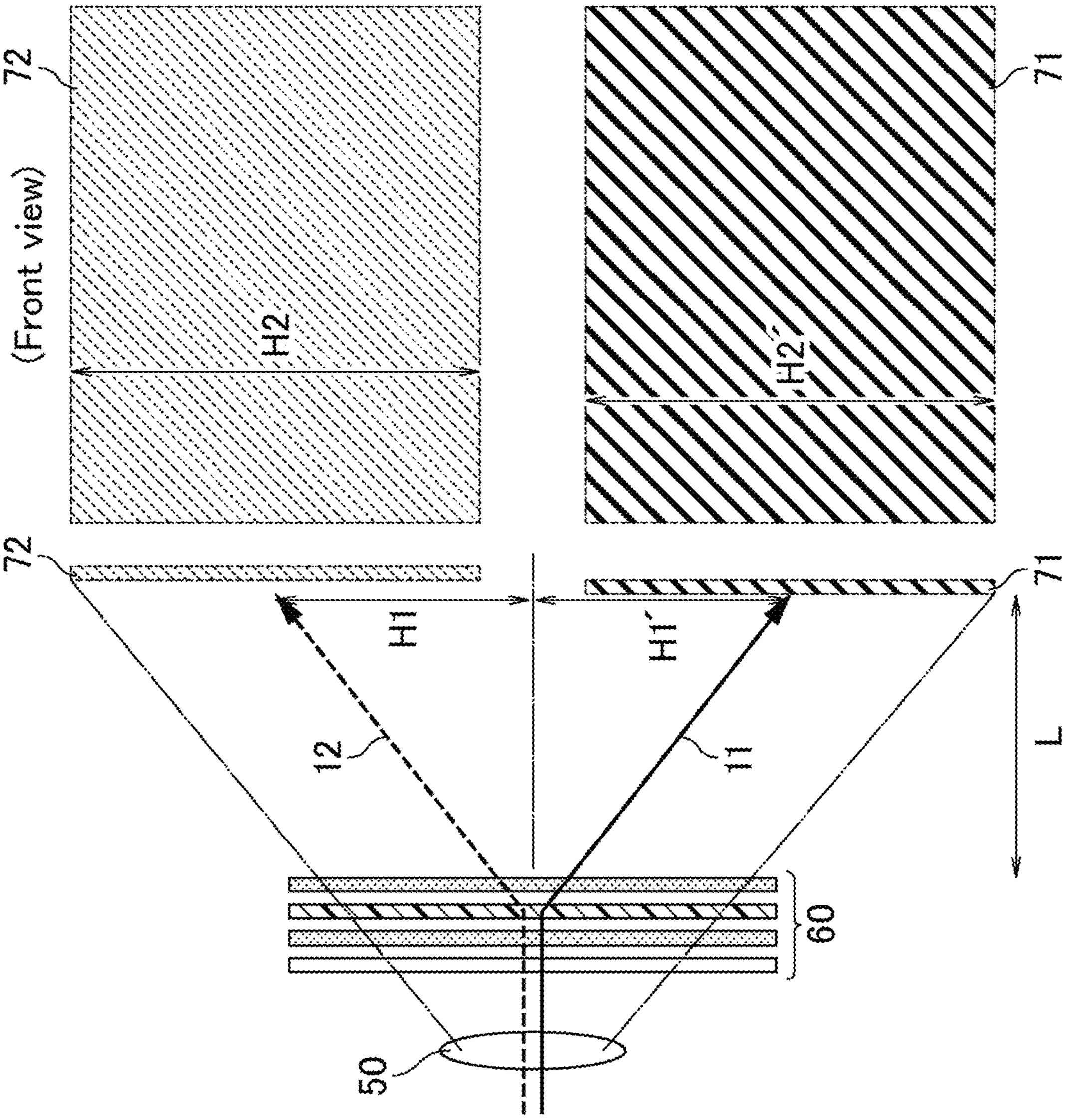
FIG. 9 is a schematic view showing another configuration of the irradiation region (2).

Specific configurations of the irradiation region (2) include, for example, a configuration where the irradiation region 71 of the light 11 from the first reflective display 41 and the irradiation region 72 of the light 12 from the second reflective display 42 overlap each other as shown in FIG. 7 (including a configuration where the regions are accurately separated with no gap in between), and a configuration where the regions do not overlap each other at all as shown in FIG. 9. FIG. 7 and FIG. 9 are schematic views showing specific configurations of the irradiation region (2). FIG. 7 and FIG. 9 are each a view (front view) showing on the right side the irradiation regions 71 and 72 as seen from the projector lens 50 side.

In the former configuration (see FIG. 7), processing is preferably performed in which an image from the first reflective display 41 and an image from the second reflective display 42 are smoothly connected. Specifically, since these images overlap or separate depending on the angle design, irradiation distance, and other conditions, a response to the change is preferably considered. For example, in the case of bending the traveling direction of light 20 degrees by the deflector 60, i.e., the case where the angle of deflection θ provided by the deflector 60 is 20 degrees, tan θ is about 0.364, and thus when the irradiation distance (i.e., distance between the projector lens 50 and the screen) L is 1 m, the shift amounts H1 and H1' of the center of light irradiation are each about 36.4 cm. The height H2 of the image projected onto the screen is basically proportional to the irradiation distance L, though it can be more or less shifted depending on the design of the projection lens in a strict sense. Thus, when H2 and H2' are each 72.8 cm, the light irradiation regions are accurately separated with no gap in between.

H1 means the distance from the center of irradiation of undeflected light 12 applied onto the screen to the center of irradiation of the deflected light 12 applied onto the screen. H1' means the distance from the center of irradiation of undeflected light 11 applied onto the screen to the center of irradiation of deflected light 11 applied onto the screen. H2 means the distance from the uppermost part to the lowermost part of the image projected onto the screen from the second reflective display 42. H2' means the distance from the uppermost part to the lowermost part of the image projected onto the screen from the first reflective display 41.

The irradiation region 71 of the light 11 and the irradiation region 72 of the light 12 are ideally accurately separated with no gap in between, but practically overlap each other (see the overlapping part 73 in FIG. 7). Also in practice, the projection target surface (screen) typically undergoes distortion (e.g., barrel distortion or pincushion distortion), and thus the irradiation regions are suitably designed to slightly overlap each other. In the designing, in the boundary between the two images (i.e., boundary between the irradiation regions 71 and 72), the positions and luminance values of the two images need to match. The matching can be performed mechanically in a strict manner. Yet, in the case where the irradiation distance L is made variable, a slight shift may occur according to the irradiation distance L, so that the image positions and/or overlapping portions are preferably adjusted by installing a component such as a camera for feedback on the states of the images, for example.

Figure 8A:
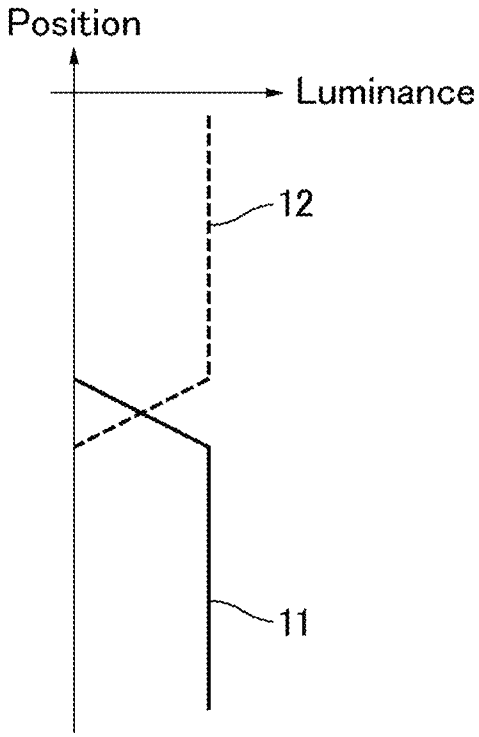
FIG. 8A is a graph conceptually showing preferred luminance values of lights in a configuration (see FIG. 7) where the irradiation region of light from the first reflective display and the irradiation region of light from the second reflective display overlap each other.
Figure 8B:
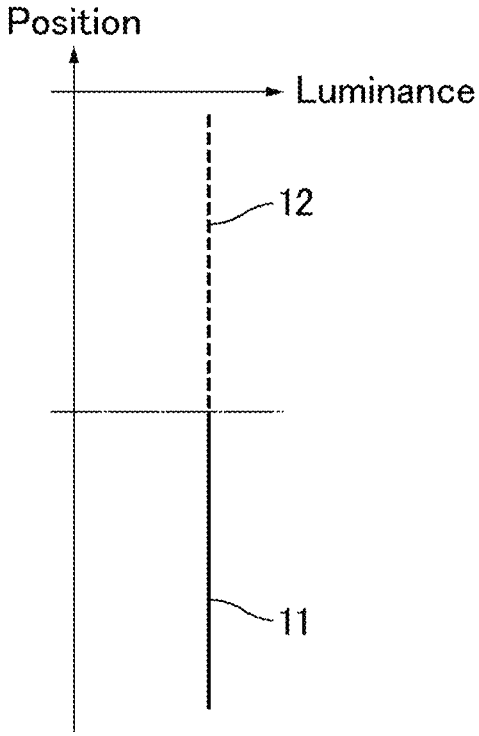

Specifically, for example, as shown in FIG. 8A, a gradient is preferably created such that the luminance values of the light 12 and the light 11 are connected to each other as naturally as possible. FIG. 8A is a graph conceptually showing preferred luminance values of the light 11 and the light 12 in a configuration (see FIG. 7) where the irradiation region 71 of the light 11 and the irradiation region 72 of the light 12 overlap each other. Also, as shown in FIG. 8B, the luminance of the light 12 and the luminance of the light 11 are preferably accurately matched in the boundary between the irradiation regions 71 and 72. FIG. 8B is a graph conceptually showing preferred luminance values of the light 11 and the light 12 in a configuration where the irradiation region 71 of the light 11 and the irradiation region 72 of the light 12 are accurately separated from each other with no gap in between. In FIG. 8A and FIG. 8B, the vertical axis representing the position corresponds to the deflection directions of the light 11 and the light 12 in FIG. 7. In other words, FIG. 7 shows that the light 12 is deflected upward in the drawing and the light 11 is deflected downward in the drawing. Correspondingly, FIG. 8A and FIG. 8B show the luminance of the light 12 along the upper part of the vertical axis and the luminance of the light 11 along the lower part of the vertical axis. In FIG. 8A and FIG. 8B, the horizontal axis representing the luminance means that the luminance increases as the axis value increases (as going to the right in the drawing).

Meanwhile, the configuration where the irradiation region 71 of the light 11 and the irradiation region 72 of the light 12 do not overlap each other at all (see FIG. 9) eliminates the need for consideration of an overlap of images in and around the boundary between the irradiation regions of the lights. Thus, there is no particular need to adjust the images.

Embodiment 2

In the present embodiment, features unique to the present embodiment are mainly described, and description of the same matters as in Embodiment 1 is omitted. The present embodiment is substantially the same as Embodiment 1, except that the number of PBDs 62 in the deflector 60 is different.

Figure 10:
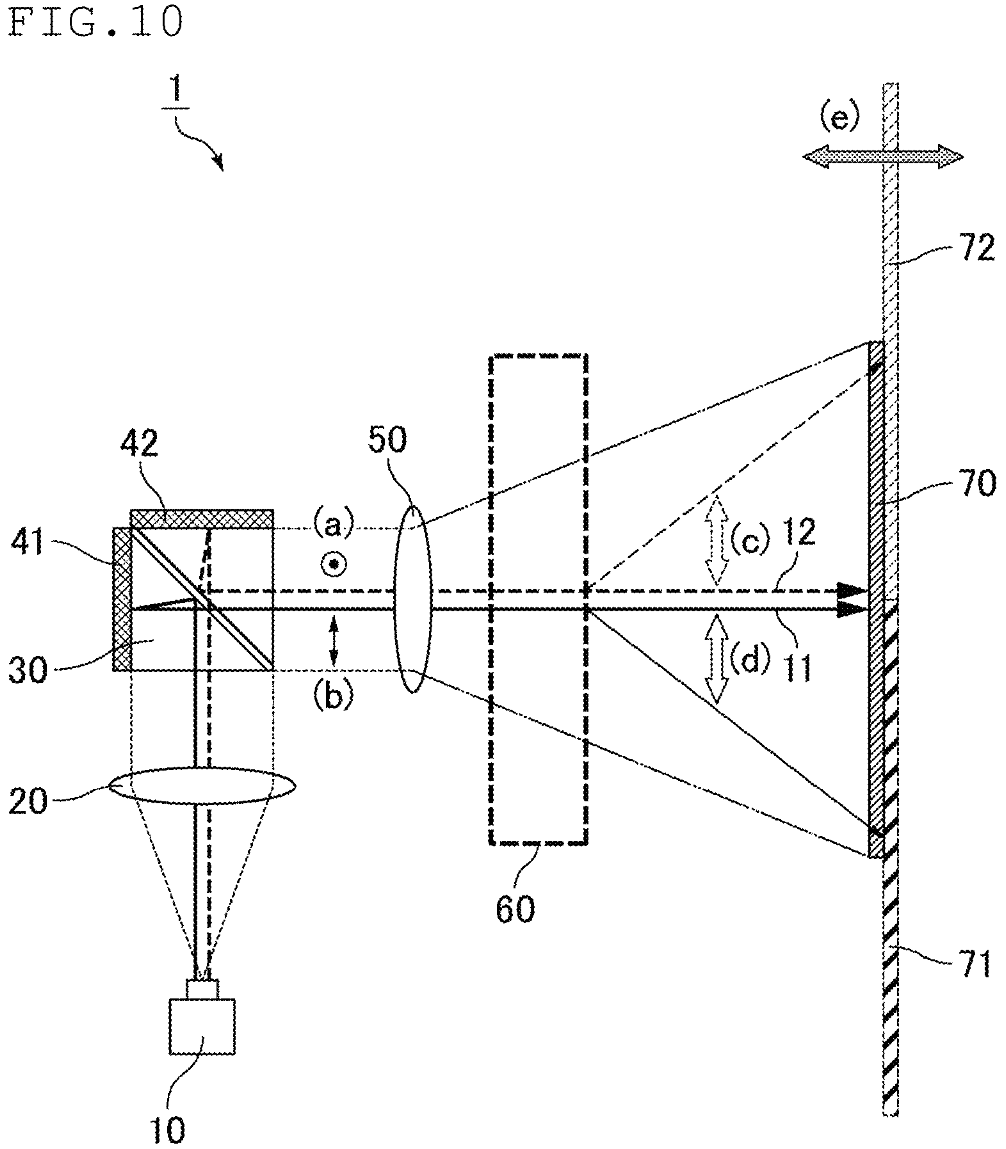
FIG. 10 is a schematic view used to consider the light irradiation mechanism in a projector of Embodiment 2.

FIG. 10 is a schematic view used to consider the light irradiation mechanism in a projector of the present embodiment. A projector 1 of the present embodiment at least includes, as shown in FIG. 10, in the light-emitting direction, a light source 10, a polarization beam splitter 30, first and second reflective displays 41 and 42, a projector lens 50, and a deflector 60. The projector 1 further includes a lens 20 between the light source 10 and the polarization beam splitter 30.

Figure 11A:
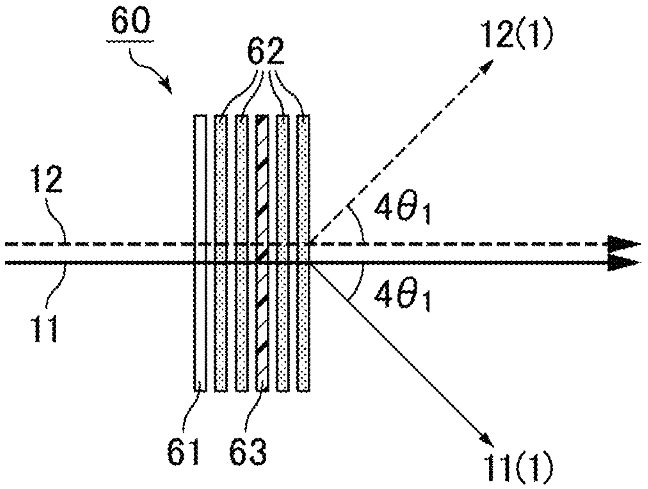
FIG. 11A is a schematic cross-sectional view of an example of a deflector used in Embodiment 2.
Figure 11B:
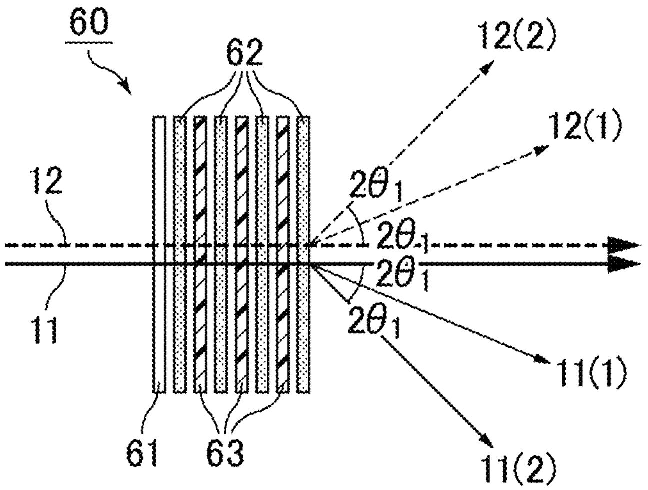
FIG. 11B is a schematic cross-sectional view of an example of a deflector used in Embodiment 2.
Figure 11C:
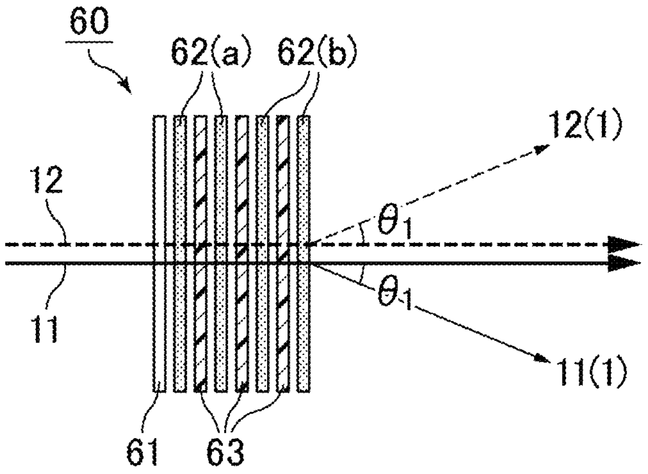
FIG. 11C is a schematic cross-sectional view of an example of a deflector used in Embodiment 2.

The deflector 60 includes a QWP 61, a PBD 62, and a sHWP 63, and the number of the PBDs 62 is four (see FIG. 11A to FIG. 11C). As described above, the angle of deflection θ of each PBD 62 is in the relationship represented by the formula (1). For example, when the rotation period of liquid crystal molecules 6230 in a liquid crystal layer 6220 of the PBD 62 is on a 2.5-μm pitch, the angle of deflection θ provided to blue light (wavelength: 450 nm) is about 10 degrees. With a laminate of two same PBDs 62 taken as one set, the angle of deflection θ of the one set is about doubled, which is about 20 degrees. Thus, increasing the number of PBDs 62 in the deflector 60 increases the angle of deflection θ provided by the deflector 60, which enables further widening of the irradiation region (2). FIG. 11A, FIG. 11B, and FIG. 11C are schematic cross-sectional views of specific examples of the deflector 60 used in the present embodiment.

The deflector 60 shown in FIG. 11A includes, sequentially from the light incident side, a QWP 61, two PBDs 62 (also referred to as a PBD 62(1)), a sHWP 63, and two PBDs 62 (also referred to as a PBD 62(2)). The PBD 62(1) is a laminate of the two PBDs 62. The PBD 62(2) is also a laminate of the two PBDs 62. In other words, in the present example, a laminate of two PBDs 62 is regarded as one set, and two laminate sets are used.

In the case where each PBD 62 has a feature of bending the traveling direction of incident circularly polarized light upward or downward and the angle of deflection provided by the PBD 62 (angle of deflection provided by one PBD 62) is $\theta_1$ degrees, the light 11 from the first reflective display 41 and the light 12 from the second reflective display 42 are respectively deflected ($2\times\theta_1$) degrees downward and deflected ($2\times\theta_1$) degrees upward as they pass through the PBD 62(1). When the sHWP 63 on which lights are incident subsequently is set in the mode (ii) of emitting incident circularly polarized light as is, the light 11 having passed through the sHWP 63 is further deflected ($2\times\theta_1$) degrees downward by the PBD 62(2), while the light 12 having passed through the sHWP 63 is deflected ($2\times\theta_1$) degrees upward by the PBD 62(2). As a result, the angles of deflection provided to the light 11 and the light 12 are quadrupled ($4\times\theta_1$). This causes, on the screen, the center of irradiation of the light 11 to move ($4\times\theta_1$) degrees downward and the center of irradiation of the light 12 to move ($4\times\theta_1$) degrees upward.

The deflector 60 shown in FIG. 11B includes, sequentially from the light incident side, a QWP 61, a PBD 62, a sHWP 63, a PBD 62, a sHWP 63, a PBD 62, a sHWP 63, and a PBD 62. In other words, the present example uses three sHWPs 63 between the four PBDs 62. When the four PBDs 62 each have a feature of bending the traveling direction of incident circularly polarized light upward or downward and the angle of deflection provided by the PBD 62 (i.e., angle of deflection provided by one PBD 62) is $\theta_1$ degrees, switching between the modes of each sHWP 63 between the PBDs 62 enables switching of the angle of deflection provided to each of the light 11 and the light 12 among three angles of deflection of 0 degrees, ($2\times\theta_1$) degrees, and ($4\times\theta_1$) degrees (see FIG. 11B). Although not shown, in the case where the four PBDs 62 each have a feature of bending the traveling direction of incident circularly polarized light upward or downward and the angles of deflection provided by two of the PBDs 62 (i.e., the angle of deflection provided by each PBD 62) is $\theta_1$ degrees while the angles of deflection provided by the other two of the PBDs 62 (i.e., the angle of deflection provided by each PBD 62) is ($\theta_1/2$) degrees, switching the modes of each sHWP 63 between the PBDs 62 enables switching of the angle of deflection provided to each of the light 11 and the light 12 among four angles of deflection of 0 degrees, $\theta_1$ degrees, ($2\times\theta_1$) degrees, and ($3\times\theta_1$) degrees.

The deflector 60 shown in FIG. 11C is an example where among the four PBDs 62 of the deflector 60 shown in FIG. 11B, two PBDs 62(*a*) on the light incident side are elements that bend the traveling direction of incident circularly polarized light $\theta_1$ degrees upward or downward, and two PBDs 62(*b*) on the light-emitting side are elements that bend the traveling direction of incident circularly polarized light leftward or rightward. The angle of deflection provided by each PBD 62(*a*) is $\theta_1$ degrees. Although FIG. 11C shows only the angle of deflection in the upward or downward direction for convenience, the lights can also be deflected leftward or rightward. In this manner, the PBD 62 configured to deflect light upward or downward and the PBD 62 configured to deflect light leftward or rightward are used in combination, so that images can be displayed upward, downward, leftward, rightward, or obliquely.

FIG. 10 shows both the case where the irradiation regions of the projector 1 form the irradiation region (1) (i.e., reference sign 70) and the case where the irradiation regions of the projector 1 form the irradiation region (2) (i.e., reference signs 71 and 72). In FIG. 10, the arrow (c) indicates that switching the modes of the sHWP in almost the same manner as in Embodiment 1 moves the center of irradiation of the light 12. The arrow (d) indicates that switching between the modes of the sHWP in almost the same manner as in Embodiment 1 moves the center of irradiation of the light 11. The arrow (e) indicates that switching the modes of the sHWP in almost the same manner as in Embodiment 1 switches the irradiation regions.

Embodiment 3

In the present embodiment, features unique to the present embodiment are mainly described, and description of the same matters as in Embodiment 1 is omitted. The present embodiment is substantially the same as Embodiment 1, except that the deflector 60 is different.

Embodiments 1 and 2 are directed to configurations where the deflector 60 includes at least one PBD 62. Yet, any other configuration with a different deflector 60 may be used as long as the deflector 60 is an element that changes the traveling direction of incident polarized light depending on polarization of the light. For example, the deflector 60 is also suitably a liquid crystal diffractive element that changes the traveling direction of incident polarized light depending on polarization of the light by regulating the alignment of liquid crystal molecules through voltage application. In the present embodiment, the deflector 60 used is a combination of two such liquid crystal diffractive elements.

Figure 12:
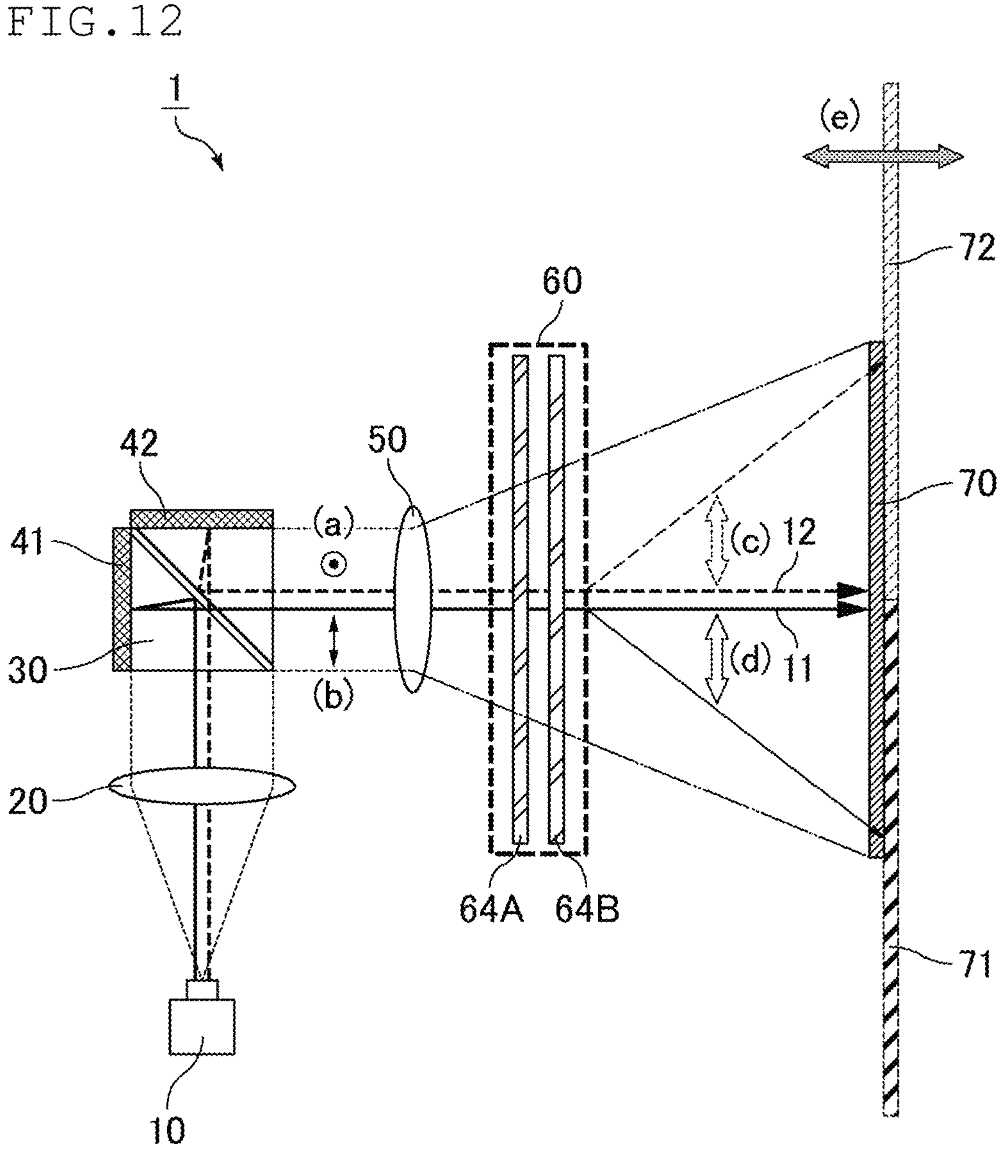
FIG. 12 is a schematic view used to consider the light irradiation mechanism in a projector of Embodiment 3.

FIG. 12 is a schematic view used to consider the light irradiation mechanism in a projector of the present embodiment. A projector 1 of the present embodiment at least includes, as shown in FIG. 12, in the light-emitting direction, a light source 10, a polarization beam splitter 30, first and second reflective displays 41 and 42, a projector lens 50, and a deflector 60. The projector 1 further includes a lens 20 between the light source 10 and the polarization beam splitter 30.

The deflector 60 consists of two liquid crystal diffractive elements 64 (see FIG. 12). The liquid crystal diffractive element 64 disposed on the light incident side is also referred to as a liquid crystal diffractive element 64A, and the liquid crystal diffractive element 64 disposed on the light-emitting side is also referred to as a liquid crystal diffractive element 64B. The liquid crystal diffractive elements 64 change the traveling direction of incident polarized light depending on polarization of the light by regulating the alignment of liquid crystal molecules through voltage application. The liquid crystal diffractive elements 64 can bend the traveling direction of incident light upward, downward, leftward, rightward, or obliquely, for example.

Figure 13A:
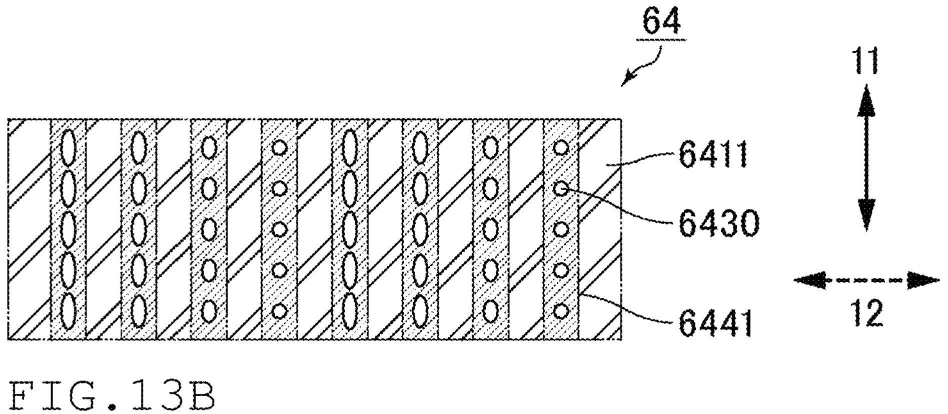
FIG. 13A is a view used to consider the alignment of liquid crystal molecules in a liquid crystal diffractive element in the projector of Embodiment 3 and is also a schematic plan view showing the alignment of liquid crystal molecules in a liquid crystal diffractive element as seen from the light incident side.
Figure 13B:
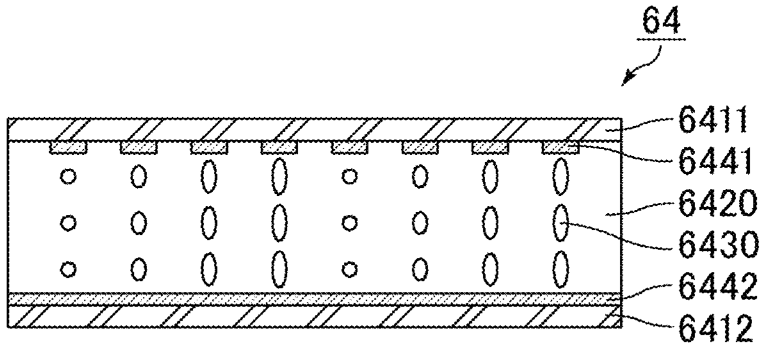
FIG. 13B is a schematic cross-sectional view of the liquid crystal diffractive element shown in FIG. 13A.
Figure 14A:
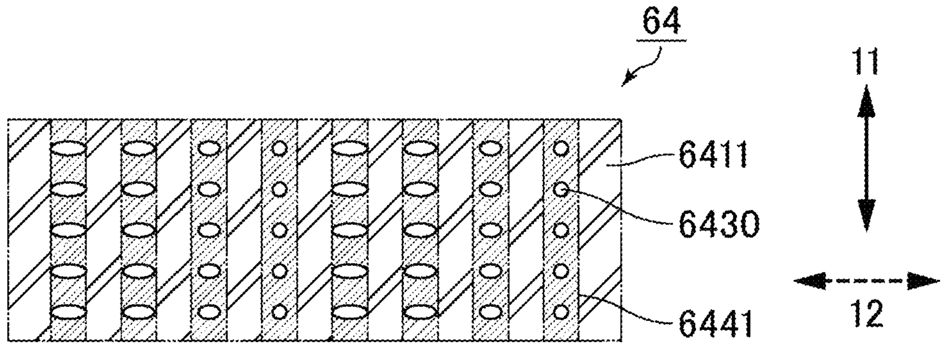
FIG. 14A is a view used to consider the alignment of liquid crystal molecules in a liquid crystal diffractive element in the projector of Embodiment 3 and is also a schematic plan view showing the alignment of liquid crystal molecules in a liquid crystal diffractive element as seen from the light incident side.
Figure 14B:
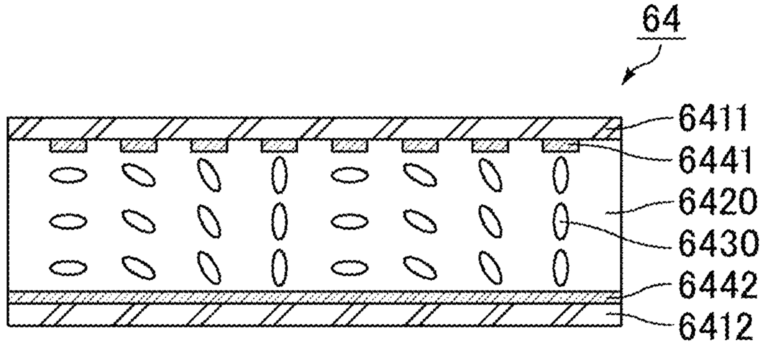
FIG. 14B is a schematic cross-sectional view of the liquid crystal diffractive element shown in FIG. 14A.
Figure 15:
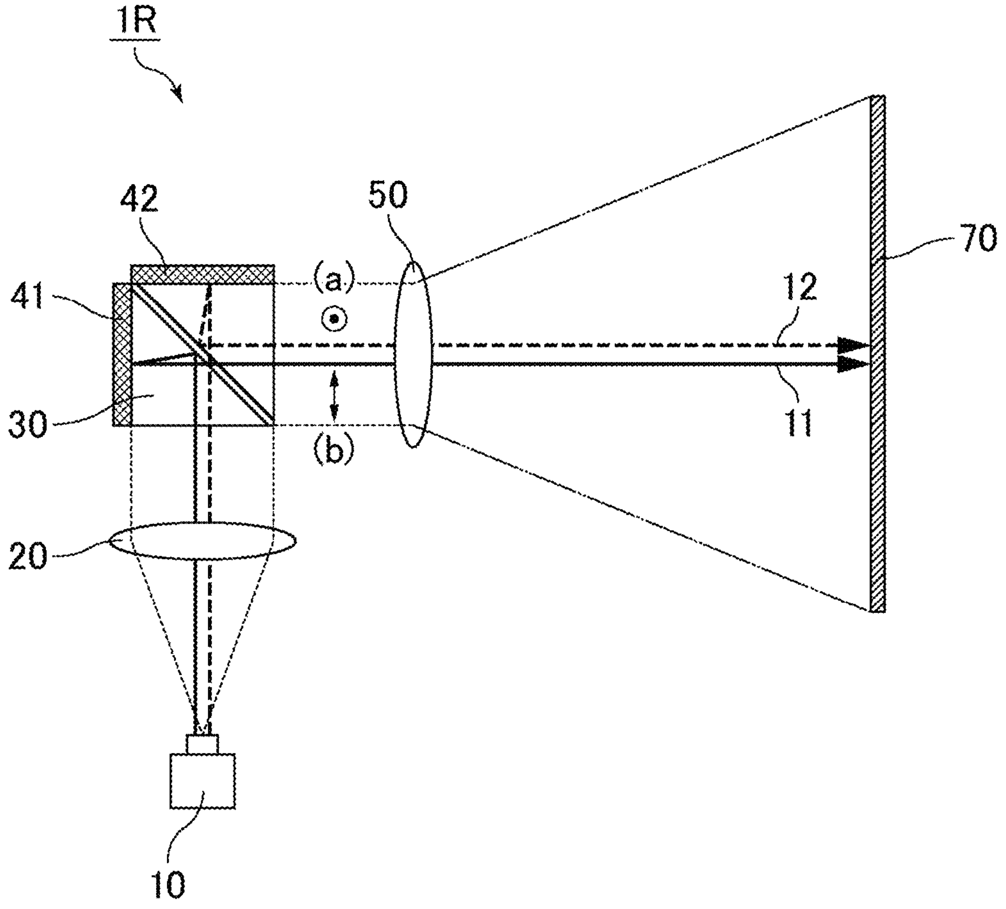
FIG. 15 is a view used to consider the light irradiation mechanism in a projector of a comparative embodiment.

Suitable as the liquid crystal diffractive elements 64 are those having a structure in which a pair of electrodes 6441 and 6442 and a liquid crystal layer 6420 are sandwiched between a pair of substrates 6411 and 6412 (see FIG. 13B and FIG. 14B, for example). When the thickness t of the liquid crystal layer 6420 is adjusted to a thickness with which a phase difference of $\lambda/2$ is introduced, for example, vertical linearly polarized light (polarized light substantially parallel to the long axis direction of liquid crystal molecules) incident on each liquid crystal diffractive element 64 is affected by the phase difference to undergo a change in its traveling direction, while horizontal linearly polarized light (polarized light substantially orthogonal to the long axis direction of liquid crystal molecules) incident on the liquid crystal diffractive element 64 is not affected by the phase difference and does not undergo a change in its traveling direction.

For example, a case is described where the liquid crystal diffractive element 64 bends the traveling direction of incident light leftward or rightward. The liquid crystal diffractive elements 64 used are each an element having a structure in which the pair of electrodes 6441 and 6442 and the liquid crystal layer 6420 are sandwiched between the pair of substrates 6411 and 6412, with the thickness t of the liquid crystal layer 6420 being adjusted to a thickness with which a phase difference of λ/2 is introduced, for example. When such a liquid crystal diffractive element 64 is seen from above (i.e., seen from the light incident side), the liquid crystal molecules can be aligned, for example, in any of the two patterns shown in FIG. 13A and FIG. 14A.

FIG. 13A, FIG. 13B, FIG. 14A, and FIG. 14B are views used to consider the alignment of liquid crystal molecules 6430 in the liquid crystal diffractive element 64. FIG. 13A and FIG. 14A are each a schematic plan view showing the alignment of liquid crystal molecules in the liquid crystal diffractive element 64 as seen from above the liquid crystal diffractive element 64 (i.e., seen from the light incident side). FIG. 13B is a schematic cross-sectional view of the liquid crystal diffractive element 64 shown in FIG. 13A. FIG. 14B is a schematic cross-sectional view of the liquid crystal diffractive element 64 shown in FIG. 14A.

The liquid crystal diffractive element 64 showing the alignment of liquid crystal molecules in FIG. 13A and FIG. 13B can be achieved by applying a vertical electric field to (i.e., generating a vertical electric field in) a liquid crystal material in which liquid crystal molecules 6430 are uniformly anti-parallelly aligned in a direction substantially parallel to the light 11 from the first reflective display 41. In a state where a vertical electric field is generated (see FIG. 13A and FIG. 13B), the traveling direction of the light 11 incident on the liquid crystal diffractive element 64 is bent (the light 11 is deflected) leftward relative to the drawing, and the traveling direction of the light 12 incident on the liquid crystal diffractive element 64 is not bent (the light 12 is not deflected). FIG. 13A shows on the right side the polarization direction of the light 11 and the polarization direction of the light 12 with the respective arrows. Changing the way of applying a vertical electric field enables switching between the mode (I) of diffracting light leftward, the mode (II) which does not affect light (i.e., transmits light straight), and the mode (III) of diffracting light rightward. In FIG. 13B (cross-sectional view), the portion where the liquid crystal molecules 6430 are substantially perpendicular to the substrates 6411 and 6412 can be achieved by, for example, applying a voltage of 5 V between the pair of electrodes 6441 and 6442, and the portion where the liquid crystal molecules 6430 are horizontal to the substrates can be achieved by applying a voltage of 0 V (i.e., applying no voltage).

The liquid crystal diffractive element 64 showing the alignment of liquid crystal molecules in FIG. 14A and FIG. 14B can be achieved by applying a vertical electric field to (i.e., generating a vertical electric field in) a liquid crystal material in which liquid crystal molecules 6430 are uniformly anti-parallelly aligned in a direction substantially parallel to the light 12 from the second reflective display 42. In a state where a vertical electric field is generated (see FIG. 14A and FIG. 14B), the traveling direction of the light 12 incident on the liquid crystal diffractive element 64 is bent (the light 12 is deflected) leftward relative to the drawing, and the traveling direction of the light 11 incident on the liquid crystal diffractive element 64 is not bent (the light 11 is not deflected). FIG. 14A shows on the right side the polarization direction of the light 11 and the polarization direction of the light 12 with the respective arrows. Changing the way of applying a vertical electric field enables switching between the mode (I) of diffracting light leftward, the mode (II) which does not affect light (i.e., transmits light straight), and the mode (III) of diffracting light rightward. In FIG. 14B (cross-sectional view), the portion where the liquid crystal molecules 6430 are substantially perpendicular to the substrates 6411 and 6412 can be achieved by, for example, applying a voltage of 5 V between the pair of electrodes 6441 and 6442, and the portion where the liquid crystal molecules 6430 are horizontal to the substrates can be achieved by applying a voltage of 0 V (i.e., applying no voltage).

Although the present embodiment shows an example of using a vertical electric field, the same alignment can also be achieved using a transverse electric field. Thus, a transverse electric field may also be used.

In the present embodiment, the liquid crystal diffractive element 64A used is an element in which the liquid crystal molecules 6430 are aligned as shown in FIG. 13A and FIG. 13B, and the liquid crystal diffractive element 64B used is an element in which the liquid crystal molecules 6430 are aligned as shown in FIG. 14A and FIG. 14B.

In each of the liquid crystal diffractive elements 64A and 64B, turning on/off the voltage and adjusting voltage values enables switching the mode to the mode (I), (II), or (III) as described above. Thus, the deflector 60 including the liquid crystal diffractive element 64A and the liquid crystal diffractive element 64B in combination is capable of both deflecting light and not deflecting light (i.e., cancelling out the deflection).

For example, when the liquid crystal diffractive element 64A is set in the mode (I) of deflecting light leftward and the liquid crystal diffractive element 64B is set in the mode (III) of deflecting light rightward with the angle of deflection provided by each liquid crystal diffractive element being $\theta_1$ degrees, the light 11 incident on the deflector 60 is deflected $\theta_1$ degrees leftward by the liquid crystal diffractive element 64A, and then deflected $\theta_1$ degrees rightward by the liquid crystal diffractive element 64B (see Table 3). As a result, the deflection provided to the light 11 is cancelled out ($\theta_1-\theta_1=0$). The light 12 incident on the deflector 60 is not deflected by the liquid crystal diffractive element 64A or 64B. On the screen, the centers of irradiation of the light 11 and the light 12 both are in front of the projector lens 50 (see Table 3). In other words, the irradiation region of the light 11 from the first reflective display 41 and the irradiation region of the light 12 from the second reflective display 42 are superimposed with each other. The resulting irradiation region is referred to as the irradiation region (1).

When the liquid crystal diffractive elements 64A and 64B are each set in the mode (I) of diffracting light leftward and the angle of deflection provided by each liquid crystal diffractive element is $\theta_1$ degrees, the light 11 incident on the deflector 60 is deflected $\theta_1$ degrees leftward by the liquid crystal diffractive element 64A, and then further deflected $\theta_1$ degrees leftward by the liquid crystal diffractive element 64B (see Table 4). As a result, the angle of deflection provided to the light 11 is doubled ($2\times\theta_1$). The light 12 incident on the deflector 60 is not deflected by the liquid crystal diffractive element 64A or 64B. On the screen, the center of irradiation of the light 11 moves ($2\times\theta_1$) degrees leftward, and the center of irradiation of the light 12 is in front of the projector lens 50 (see Table 4). In other words, the light irradiation region as a whole is widened. The whole irradiation region is referred to as the irradiation region (2).

TABLE 3

| | Liquid crystal display element 64A | Liquid crystal display element 64B | Center of irradiation |
|---|---|---|---|
| Image light 11 from first reflective display | $\theta_1$ degrees leftward | $\theta_1$ degrees rightward | Front |
| Image light 12 from second reflective display | No change | No change | Front |

TABLE 4

| | Liquid crystal display element 64A | Liquid crystal display element 64B | Center of irradiation |
|---|---|---|---|
| Image light 11 from first reflective display | $\theta_1$ degrees leftward | $\theta_1$ degrees leftward | 2 × $\theta_1$ degrees leftward |
| Image light 12 from second reflective display | No change | No change | Front |

As described above, the deflector 60 of the present embodiment is also expected to achieve almost the same effect as the deflector 60 using at least one PBD 62 as in Embodiments 1 and 2, and the irradiation region formed by the irradiation regions of the projector 1 can be switched between the irradiation region (1) and the irradiation region (2) as in Embodiments 1 and 2.

Although the case has been described above where the liquid crystal diffractive element 64 diffracts the traveling direction of incident light leftward or rightward, changing the positions of the electrodes constituting the liquid crystal diffractive element 64 also enables diffraction of light upward or downward (see FIG. 12).

FIG. 12 shows both a case where the irradiation regions of the projector 1 form the irradiation region (1) and a case where the irradiation regions form the irradiation region (2). In FIG. 12, the arrow (c) indicates that switching the modes of each of the liquid crystal diffractive element 64A and 64B moves the center of irradiation of the light 12. The arrow (d) indicates that switching the modes of each of the liquid crystal diffractive elements 64A and 64B moves the center of irradiation of the light 11. The arrow (e) indicates that switching the modes of each of the liquid crystal diffractive elements 64A and 64B switches the irradiation regions.

Embodiment 4

In the present embodiment, features unique to the present embodiment are mainly described, and description of the same matters as in Embodiment 1 is omitted. The present embodiment is substantially the same as Embodiment 3, except that the deflector 60 is different.

In the present embodiment, the deflector 60 includes one liquid crystal diffractive element 64. The liquid crystal diffractive element 64 is suitably one having a structure in which a pair of electrodes 6441 and 6442 and a liquid crystal layer 6420 are sandwiched between a pair of substrates 6411 and 6412 (e.g., see FIG. 13B and FIG. 14B). Generating a vertical electric field in the entire liquid crystal diffractive element 64 (e.g., the voltage value between the pair of electrodes 6441 and 6442 is set at 5 V) raises all the liquid crystal molecules 6430 substantially perpendicularly to the substrates 6411 and 6412. In this case, the in-plane phase difference distribution in the liquid crystal diffractive element 64 can be eliminated, so that turning on/off of voltage and adjusting voltage values, for example, enables switching between the mode (IV) of deflecting light and the mode (V) which does not affect light (i.e., transmits light straight). Thus, one liquid crystal diffractive element 64 alone as the deflector 60 can achieve both changing the traveling direction of incident polarized light depending on polarization of the light (i.e., deflecting the light) and not changing the traveling direction of the light (i.e., not deflecting the light).

For example, when the liquid crystal diffractive element 64 is set in the mode (V) which does not affect light, the light 11 and the light 12 incident on the deflector 60 (i.e., liquid crystal diffractive element 64) are both transmitted without being deflected (see Table 5). On the screen, the centers of irradiation of the light 11 and the light 12 are in front of the projector lens 50 (see Table 5). In other words, the irradiation region of the light 11 from the first reflective display 41 and the irradiation region of the light 12 from the second reflective display 42 are superimposed with each other. The resulting irradiation region is referred to as the irradiation region (1).

When the liquid crystal diffractive element 64 is set in the mode (IV) of deflecting light, more specifically in the mode of deflecting light leftward, for example, and the angle of deflection provided by the liquid crystal diffractive element 64 is $\theta_1$ degrees, the light 11 incident on the deflector 60 (i.e., liquid crystal diffractive element 64) is deflected $\theta_1$ degrees leftward (see Table 6). The light 12 incident on the deflector 60 is not deflected. On the screen, the center of irradiation of the light 11 moves $\theta_1$ degrees leftward, and the center of irradiation of the light 12 is in front of the projector lens 50 (see Table 6). In other words, the light irradiation region as a whole is widened. The whole irradiation region is referred to as the irradiation region (2).

TABLE 5

| | Liquid crystal diffractive element 64 | Center of irradiation |
|---|---|---|
| Image light 11 from first reflective display | No change | Front |
| Image light 12 from second reflective display | No change | Front |

TABLE 6

| | Liquid crystal diffractive element 64 | Center of irradiation |
|---|---|---|
| Image light 11 from first reflective display | $\theta_1$ degrees leftward | $\theta_1$ degrees leftward |
| Image light 12 from second reflective display | No change | Front |

As described above, the deflector 60 of the present embodiment is also expected to achieve almost the same effect as the deflector 60 using at least one PBD 62, and thus the irradiation region formed by the irradiation regions of the projector 1 can be switched between the irradiation region (1) and the irradiation region (2).

Although the present embodiment shows an example of using a vertical electric field, the same alignment can also be achieved using a transverse electric field. Thus, a transverse electric field may also be used. Changing the positions of the electrodes constituting the liquid crystal diffractive element 64 also enables diffraction of light upward or downward.

Embodiments of the present invention have been described above. Each and every matter described above is applicable to the general aspects of the present invention.

EXAMPLES

The present invention is described in more detail below with reference to examples. The present invention, however, is not limited to these examples.

Example 1

A projector of the present example corresponds to the projector of Embodiment 1. The PBD 62 used has a feature of bending the traveling direction of light upward or downward. The projector of the present example has a high light use efficiency and can switch the light irradiation region between the irradiation region (1) and the irradiation region (2).

Examples 2-1 to 2-3

Projectors of the present examples correspond to the projector of Embodiment 2. The PBDs 62 used each have a feature of bending the traveling direction of light upward or downward. The deflector 60 used in Example 2-1 is a deflector having the structure shown in FIG. 11A. The deflector 60 used in Example 2-2 is a deflector having the structure shown in FIG. 11B. The deflector 60 used in Example 2-3 is a deflector having the structure shown in FIG. 11C. The projectors of the present examples have a high light use efficiency and can switch the light irradiation region between the irradiation region (1) and the irradiation region (2).

Example 3

A projector of the present example corresponds to the projector of Embodiment 3. The deflector 60 used includes the liquid crystal diffractive element 64A and the liquid crystal diffractive element 64B, and the liquid crystal diffractive elements 64A and 64B have a feature of deflecting the traveling direction of incident light upward or downward. The projector of the present example has a high light use efficiency and can switch the light irradiation region between the irradiation region (1) and the irradiation region (2).

Example 4

A projector of the present example corresponds to the projector of Embodiment 4. The deflector 60 used includes one liquid crystal diffractive element 64 and the liquid crystal diffractive element 64 has a feature of deflecting the traveling direction of incident light leftward or rightward. The projector of the present example also has a high light use efficiency and can switch the light irradiation region between the irradiation region (1) and the irradiation region (2).

The embodiments of the present invention described above may appropriately be combined within the range not departing from the gist of the present invention.

REFERENCE SIGNS LIST

- 1, 1R: projector
- 10: light source
- 11, 12: light
- 20: lens
- 30: polarization beam splitter
- 40, 41, 42: reflective display
- 50: projector lens
- 60: deflector
- 61: λ/4 waveplate (QWP)
- 62: PB deflector (PBD)
- 63: switchable half-wave plate (sHWP)
- 64, 64A, 64B: liquid crystal diffractive element
- 70, 71, 72: screen or irradiation region
- 73: overlapping part between irradiation region 71 and irradiation region 72
- 100: circularly polarized light
- 100L: left-handed circularly polarized light
- 100R: right-handed circularly polarized light
- 100(R): deflection direction of emitted light derived from incident right-handed circularly polarized light
- 100(L): deflection direction of emitted light derived from incident left-handed circularly polarized light
- 6211, 6212, 6311, 6312, 6411, 6412: substrate
- 6220, 6320, 6420: liquid crystal layer
- 6230, 6330, 6430: liquid crystal molecule
- 6441, 6412: electrode

What is claimed is:

1. A projector comprising:

a light source;

a polarization beam splitter configured to split light from the light source into P-polarized light and S-polarized light;

a first reflective display configured to modulate the split P-polarized light;

a second reflective display configured to modulate the split S-polarized light;

a projector lens on which reflected lights from the reflective displays are incident; and a deflector disposed on a light-emitting side of the projector lens and configured to switch between a mode of changing traveling directions of both incident P-polarized light and incident S-polarized light and a mode of not changing the traveling directions of the P-polarized light and the S-polarized light; wherein when the traveling directions of the incident P-polarized light and the incident S-polarized light are changed, the projector includes a region in which a first irradiation region irradiated with light from the first reflective display and a second irradiation region irradiated with light from the second reflective display do not overlap each other.

2. The projector according to claim 1, wherein the deflector is an element using liquid crystals.

3. The projector according to claim 2, wherein the deflector comprises a switchable half-wave plate (sHWP).

4. The projector according to claim 1, wherein the deflector comprises a Pancharatnam-Berry (PB) deflector.

5. The projector according to claim 4, wherein the deflector comprises a switchable half-wave plate (sHWP).

6. The projector according to claim 1, wherein the deflector comprises two or more Pancharatnam-Berry (PB) deflectors.

7. The projector according to claim 6, wherein the deflector comprises a switchable half-wave plate (sHWP).

8. The projector according to claim 1, wherein the deflector comprises four or more Pancharatnam-Berry (PB) deflectors.

9. The projector according to claim 8, wherein the deflector comprises a switchable half-wave plate (sHWP).

10. The projector according to claim 1, wherein the deflector comprises a switchable half-wave plate (sHWP).

11. The projector according to claim 1, wherein the deflector comprises a liquid crystal diffractive element, and the liquid crystal diffractive element is configured to change a traveling direction of incident polarized light depending on the polarized light by regulating an alignment of liquid crystal molecules through voltage application.

12. The projector according to claim 11, wherein a number of liquid crystal diffractive elements is one or more.

13. The projector according to claim 1, wherein the first irradiation region and the second irradiation region include a region where a portion of the first irradiation region and a portion of the second irradiation region overlap each other.

* * * * *